United States Patent [19]

Creffield

[11] Patent Number: 4,474,104
[45] Date of Patent: Oct. 2, 1984

[54] CONTROL SYSTEM FOR VARIABLE DISPLACEMENT PUMPS AND MOTORS

[75] Inventor: David F. Creffield, Grass Lake, Mich.

[73] Assignee: Double A Products Co., Manchester, Mich.

[21] Appl. No.: 484,077

[22] Filed: Apr. 11, 1983

[51] Int. Cl.³ ............................................. F01B 25/06
[52] U.S. Cl. ...................................... 91/497; 60/447; 60/448; 417/221
[58] Field of Search .................. 417/213, 219, 221; 91/491, 497; 60/447, 448

[56] References Cited

U.S. PATENT DOCUMENTS

| | | | |
|---|---|---|---|
| 3,628,330 | 12/1971 | Miller | 60/911 |
| 3,810,715 | 5/1974 | Week | 417/213 |
| 4,103,489 | 8/1978 | Fletcher | 60/448 |
| 4,320,692 | 3/1982 | Komiya | 91/497 |
| 4,351,152 | 3/1982 | Reynolds | 60/448 |

Primary Examiner—William L. Freeh
Attorney, Agent, or Firm—Stephenson and Boller

[57] ABSTRACT

A hydraulic motor control system comprises a speed control loop and a pressure control loop which provide closed loop control of a variable displacement chamber space and the mechanical advantage coupling thereof to the motor output shaft. The speed control loop is effective in the speed control mode of operation to maintain a set speed within a given load range. In response to load increases beyond said range, the pressure control loop pre-empts the speed control loop so that the control operates in a constant horsepower mode.

20 Claims, 9 Drawing Figures

CONTROL SYSTEM FOR VARIABLE DISPLACEMENT PUMPS AND MOTORS

BACKGROUND AND SUMMARY OF THE INVENTION

This invention relates generally to rotary expansible chamber devices having variable displacements (i.e. variable displacement pumps and motors) and more specifically to a control system for such devices which possesses new and unique operating capabilities.

Hydraulic motors are employed in many applications where substantial amounts of power must be delivered at relatively low shaft velocities. Examples of typical uses includes winch drives, agricultural and earth moving machinery drives, propeller drives, and rotary drives for large machines.

Speaking in a general way, it is possible to control a hydraulic motor's output characteristics (i.e. shaft speed and torque) by controlling the flow rate and pressure, respectively, of the hydraulic fluid which powers the motor. Unsophisticated forms of this type of control can be wasteful of hardware and power, and they may not even meet the desired control objectives. For example, that sort of control may comprise the inclusion of separate pressure and flow control devices in the hydraulic fluid power line to the motor with the pressure and flow control functions being accomplished by these devices. Moreover, operation of these control devices typically is by means of electro-hydro-mechanical devices which are calculated to perform the control functions, but the level of system performance which is obtainable may fall short of the desired control objectives or may not be cost effective. More sophisticated forms may require expensive servo valves and controls and/or special types of pumps and controls.

Certain types of hydraulic motors comprise means for mechanically adjusting the motor's characteristics. Two important types are the radial piston type and the axial piston type. In each of these the ratio of displacement volume to output shaft rotation may be mechanically adjusted over a given range so as to provide within said range any desired ratio. In other words, they are variable displacement motors. Control systems may be associated with these motors to provide for this adjustment on a continuous basis so that a continuous control capability is attained. Stated another way, the mechanical adjustment mechanism in such a motor is capable of adjusting the mechanical advantage of the cylinder's pistons on the output shaft. As the mechanical advantage increases, the ratio of displacement volume to shaft rotation also increases, and at constant pressure and flow, the increasing mechanical advantage creates an increasing output shaft torque and a decreasing output shaft speed. Similarly as the mechanical advantage decreases, the displacement volume to shaft rotation ratio also decreases and at constant pressure and flow, the decreasing mechanical advantage creates decreasing output shaft torque and an increasing output shaft speed. In the ensuing description the term "mechanical advantage" will be used in this sense.

In an axial type hydraulic motor, the mechanical advantage is adjusted by means of a swash plate coupling of the cylinder pistons to the motor output shaft. The swash plate angle is adjustable to adjust the relationship between piston travel within the cylinders and the motor shaft axis to thereby adjust the mechanical advantage. In a radial cylinder type motor one construction for adjusting the mechanical advantage is by means of an adjustable eccentric coupling between the cylinder pistons and the output shaft. The degree of eccentricity of an eccentric about the motor output shaft is adjusted over an adjustment range to provide a corresponding change in the mechanical advantage. In both radial and axial cylinder motors, the output shaft speed is essentially directly proportional to the volumetric flow of pressurized hydraulic fluid power into the motor for a given mechanical advantage.

An especially good example of a radial piston motor, and the one which is employed in the preferred embodiment of the present invention, is disclosed in U.S. Pat. No. 3,828,400 issued Aug. 13, 1974. The motor of that patent is marketed under the trade name Staffa, and it has enjoyed significant commercial success even to the point where it has been substantially copied by other manufacturers. In the motor of the type shown in U.S. Pat. No. 3,828,400 an eccentric in the form of a ring is disposed around the output shaft. Pistons within the radial cylinders are coupled via connecting rods to the eccentric with the radially inner ends of the connecting rods having slippers which are disposed against the radially outer surface of the eccentric. The eccentric has keyed connections with the output shaft so as to be rotatably coupled with the output shaft but to be bodily displacable radially of the output shaft to vary the eccentricity. The radial adjustment of the eccentric is performed by means of hydraulic actuated control pistons disposed within radial bores of the output shaft which act against the inner periphery of the eccentric.

In a control system for this type of motor an electrically controlled hydraulic valve is connected with the control pistons so as to control the application of hydraulic control fluid to the control pistons and thereby adjust the position of the eccentric.

As a practical matter, most motor applications do not involve a constant steady state mode of operation. Accordingly, adjustment controls for a motor are a virtual necessity. For a hydraulic motor, two independent control parameters which are commonly used are flow and pressure. It will be appreciated of course that these two particular parameters are related with other parameters including speed, torque, and horsepower and that known mathematical formulae define the relationships. For example, the output shaft horsepower is equal to the product of the output shaft speed and the output shaft torque. The horsepower output of the motor is equal to the horsepower input to the motor times the efficiency. In hydraulic motor systems, this efficiency can be quite high. Since the product of pressure times flow is equal to the input horsepower to a hydraulic motor, the output shaft speed and pressure of hydraulic power fluid to the motor are two independent parameters which may be monitored and adjusted to control the horsepower output of the motor.

In many control applications, it is desirable to either provide an infinitely variable speed control which is operable to maintain a set output shaft speed in spite of load changes within a given range, or a constant horsepower control which is operable to maintain a constant horsepower output for a variable load over a given range.

The present invention comprises a hydraulic motor control system which embodies both of these capabilities in a new and unique way. It possesses an operating characteristic which can maintain a desired set speed for the motor output shaft within a given load range but which in response to load increases beyond said given range assumes a constant horsepower mode of operation. Adjustable controls are provided to set desired control parameters, speed and pressure in the disclosed embodiment, and other controls are additionally provided to establish maximum limits for these parameters.

In general, for a given speed setting a certain range of loads can be driven by the motor without any need to adjust the motor's displacement because the pressure can rise and fall to handle increases and decreases in load within this certain range. If on the one hand there is a fluctuation which gives rise to a certain incipient increase in shaft speed, that incipient speed increase is effective, via the control, to regulate the shaft speed back to the speed setting by causing the motor's displacement to increase in an appropriate amount. Even though the increased displacement is inherently accompanied by an increase in the mechanical advantage of the motor, that increase is not incompatible with the load on the motor because the pressure will stabilize at an appropriate level. In other words, even though the increase to mechanical advantage by itself would tend to increase the torque output of the motor, the final pressure will be appropriate to the motor load at the increased displacement for maintaining the desired speed.

On the other hand, should the motor load increase from a load within the range which can be driven by the motor at the set speed so as to exceed the maximum of that range for that set speed, the control operates in a constant horsepower fashion. Exactly how the control arrives at constant horsepower operation depends upon a number of factors including the specific control electronics (including their calibration and adjustment) and the exact nature of the load increase. The load increase is reflected as incipient pressure increase and/or speed decrease. With the specific electronic control circuit to be described later, the control, at least initially in response to load increase, seeks to maintain a speed control mode of operation by the electronics commanding a decrease in the displacement before the mode enters constant horsepower.

For certain types of load changes, decrease in the motor displacement indeed occurs thereby attempting to increase the shaft speed so as to correct for the incipient speed reduction. Such an initial adjustment for purposes of speed correction reduces the mechanical advantage in the wrong direction for achieving increased torque which is required for the increased load. Since an increased load will typically occasion an increase in the pressure even if no reduction in the motor's mechanical advantage is made, any initial reduction in the motor's mechanical advantage for speed regulation purposes is therefore effective to augment the pressure increase so that the pressure rise is even more rapid than would be the case if no reduction in mechanical advantage took place. When a set pressure level has been equalled or exceeded, the control transfers from the previous "speed control" mode providing constant speed output to a new "horsepower control" mode providing constant horsepower output.

For more extreme load changes the response of the mechanical advantage adjustment is not fast enough to cause any actual reduction in displacement before the constant horsepower mode takes over. Such more extreme load change will have resulted in the pressure rising such that the constant horsepower control mode essentially instantaneously takes effect so that the mechanical advantage begins immediately to be adjusted in the direction of full displacement without any initial decrease in displacement.

In the constant horsepower control mode the mechanical advantage is caused to increase even though this correction is in the wrong direction to correct for the speed decrease. So long as the pressure remains at or above the predetermined set pressure level (as set by an adjustable pressure setting control) the mechanical advantage of the motor continues to increase for the purpose of delivering increased torque to the motor output shaft. Stated another way, the constant horsepower control mode overrides the speed control mode to allow the motor speed to drop to a level at which sufficient torque can be developed to overcome the increased motor load providing constant output horsepower and then once sufficient motor torque is being delivered, the speed will stabilize and no further increases in displacement will be made. If the load subsequently begins to decrease, the motor shaft speed is caused to increase back toward the set speed with the motor providing constant horsepower output whereby the motor operates at the largest speed below the set speed at which it can deliver the required torque. Presuming that the load returns to its original level or lower, the control reverts to the speed control mode once the shaft speed equals the set speed.

If instead of the load dropping, it continues to increase to a maximum and the motor is still unable to satisfy demand at the set pressure, then the motor stalls.

In a preferred form of control system which is associated with a hydraulic motor pursuant to this invention, adjustable speed and pressure setting controls are provided for use by an operator. There are also provided with the control, and not accessible by an operator, a preset maximum pressure limit and a preset maximum speed limit to establish internal command limits which prevail over any other commands which would exceed said limits so that actual pressure and speed are always limited to the mechanical ratings of the motor or to a lower rating of the particular usage of the motor.

Briefly, the control system of the present invention applied to one embodiment to a variable displacement motor of the type described above comprises an electronic control circuit which controls a variable control valve which in turn controls the hydraulically actuated control pistons for controlling the mechanical advantage of the hydraulic motor. The electronic control circuit receives input signals from transducers, or sensors, associated with the motor. One sensor is a pressure transducer which senses the fluid pressure in the system. Another is the tachometer which senses motor shaft speed. These sensors and their associated conditioning circuits develop signals representative of pressure and speed respectively, and the electronic control circuit acts upon these signals in controlling the variable control valve.

The speed and pressure settings which in the disclosed embodiment are controllable by an operator comprise respective potentiometers which are adjustable to establish respective signals representative of desired speed and pressure, pressure being indicative of load. For a person operating the control, the speed control setting is invariably labeled in terms of speed, and the pressure control setting is usually labeled in terms of pressure. Because pressure, at a given flow and displacement, represents torque and horsepower, a control labeled in a parameter other than pressure could be displayed to the operator for the load setting control.

The maximum pressure and maximum speed limit controls are also potentiometers in the preferred disclosed embodiment and they establish the maximum permissible pressure and speed respectively. The electronic control circuit is effective to prevent the motor from exceeding a pressure or a speed above the maximum allowable levels as set on these latter potentiometers even though other signals may be commanding otherwise.

The electronic control circuit is organized and arranged in a speed control loop and a pressure control loop, both of these being in the nature of closed feedback loops which receive the sensed speed and pressure signals and act upon them in certain relationships with the speed and pressure settings of the potentiometers to control the variable control valve and hence the mechanical advantage of the motor. The two loops however, an alluded to above, have an interaction whereby the control transfers from one loop to another under certain operative conditions so that at certain times the speed control loop provides control to the exclusion of the pressure control loop while at other times the pressure control loop provides control to the exclusion of the speed control loop. There is also a further minor loop around the variable control valve to insure the best correspondence of the valve to the commanded position.

Organization of the control electronics is such that its basic design may be adapted for different sized motors by merely changing the values of certain individual components. The electronic control is also arranged such that it may be packaged for use as original equipment with an original equipment motor, or on existing motors as replacement of the existing controls.

The preferred embodiment also comprises the advantage of bi-directional motor operation and control. In the preferred embodiment this capability is accomplished by means of a shuttle valve which is connected across the motor ports and which is associated with the pressure transducer so that the action of the control is effective regardless of flow direction. An ancillary aspect of this arrangement of the hydraulic circuit and control is that the control becomes inherently effective to retard the motor should the motor overrun.

Many applications in which hydraulic motors are used do not impose constant load demands. For example, consider an anchor winch on a ship. The initial operation to raise the anchor requires maximum torque in order to overcome the inertial force of the anchor and paid-out line and any resistive forces acting on them. As the anchor is towed in, the torque demand will generally decrease. To take advantage of the reduced torque demand, speed can be increased along a constant horsepower curve until such time as the maximum allowable winding speed is reached. With prior types of manual controls, it is essentially impossible to satisfactorily manually adjust the controls so as to reel in the anchor in minimum time. With the present invention the reel-in time can be minimized while insuring a maximum reel-in speed within a desired speed limit.

The foregoing features, advantages and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENT

Figure 1:
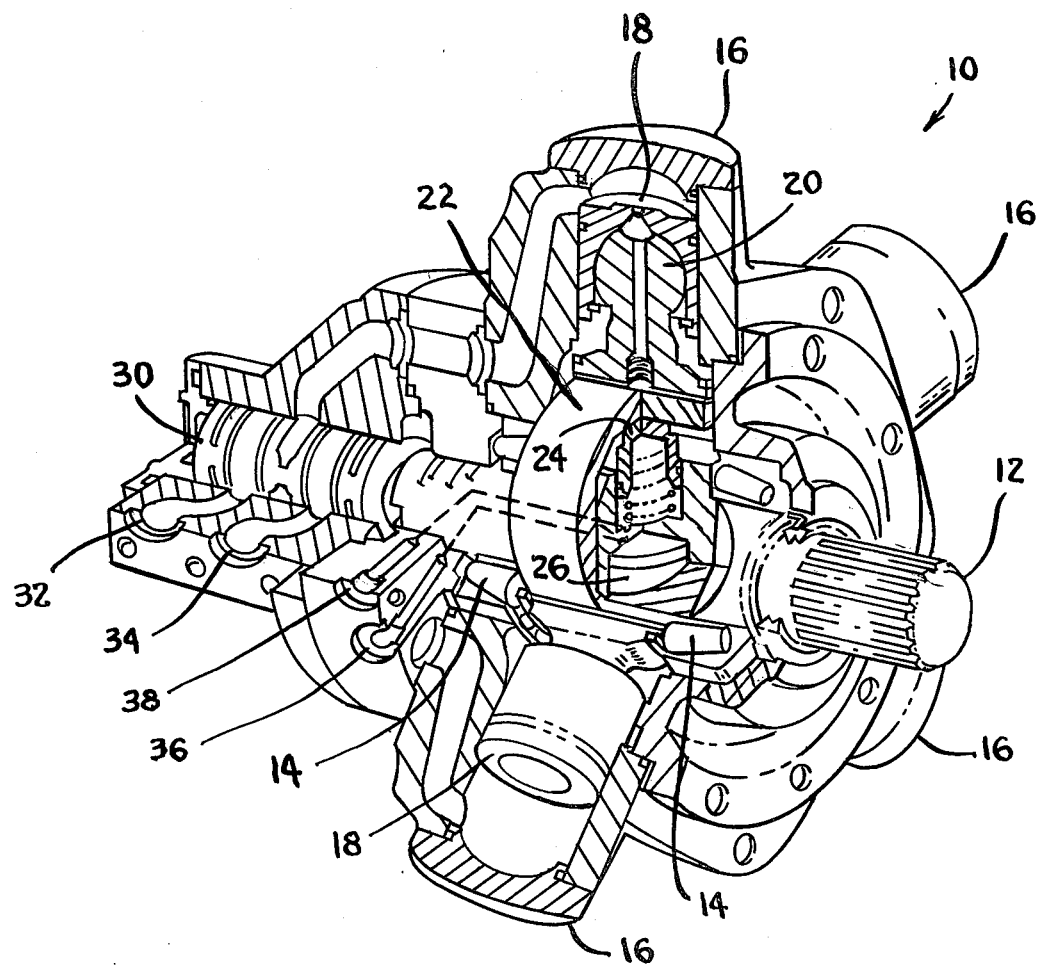
FIG. 1 is a perspective view having portions broken away of a preferred form of hydraulic motor which may be used with the present invention.
Figure 2:
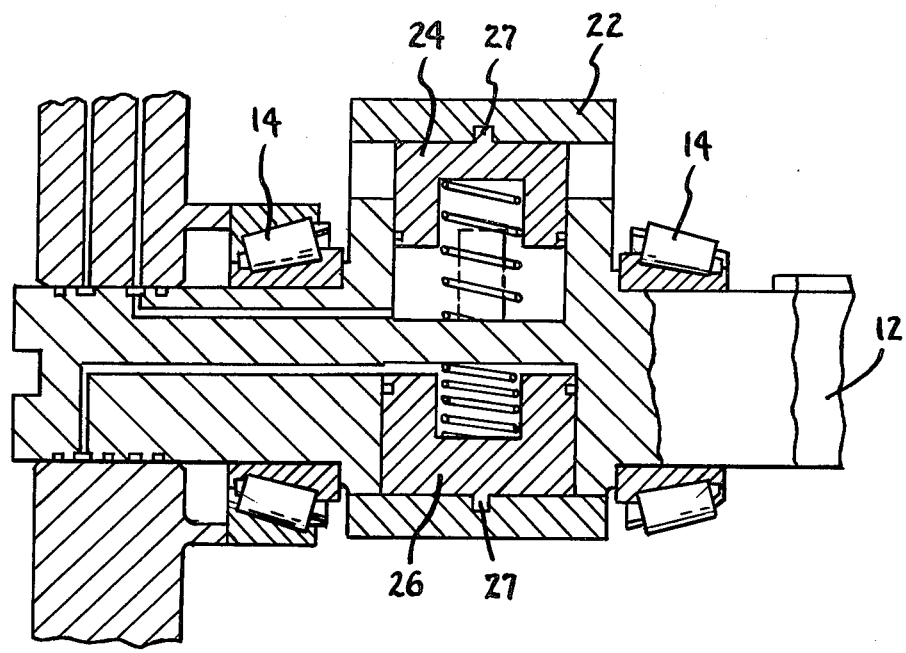
FIG. 2 is a fragmentary longitudinal sectional view through a portion of the motor of FIG. 1.
Figure 3:
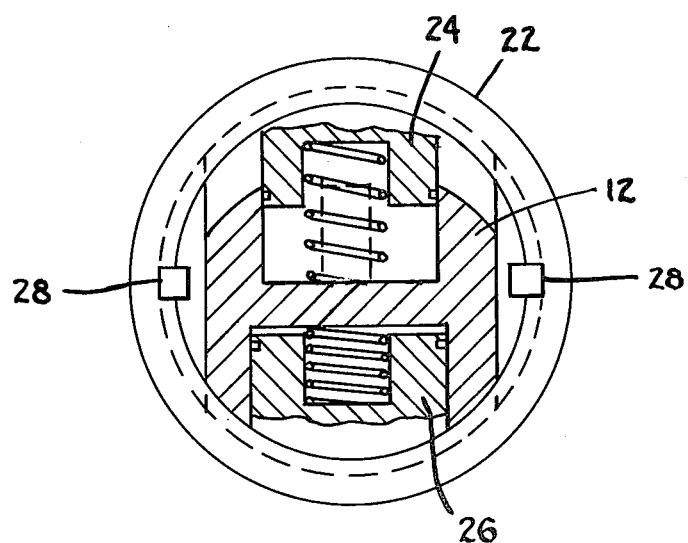
FIG. 3 is a transverse cross sectional view through a portion of the motor of FIG. 1.

FIGS. 1, 2 and 3 illustrate a preferred embodiment of hydraulic motor 10 which is used with the present invention in a hydraulic motor application of the invention. Motor 10 is essentially like that illustrated in U.S. Pat. No. 3,828,400 referred to above. Motor 10 comprises a shaft 12 journaled on suitable arrays of bearings 14 on the body of the motor with the shaft output being at the right hand end as viewed in FIG. 2.

A plurality of cylinders 16 are disposed radially around the body of the motor and in the illustrated embodiment there are five such radial cylinders. Disposed for reciprocation within each cylinder 16 is a piston 18. The operative coupling of each piston 18 with the shaft includes a connecting rod 20. The radially outer ends of the connecting rods have a ball-and-socket type connection with the pistons and the inner ends terminate in arcuate slippers which are disposed against the outer perimeter of an eccentric 22. The eccentric 22 is of annular shape having a circular outside diameter. It is operatively coupled with shaft 12 by means of control pistons 24 and 26 which are arranged on diametrically opposite sides of the central enlarged portion of shaft 12 which lies axially between the two arrays of bearings 14. The control pistons fit within cylinder bores of the shaft and have a keyed engagement 27 with the inner periphery of the eccentric. The eccentric is itself rotationally keyed to shaft 12 as provided by the keys 28 which can be seen in FIG. 3. Springs may be employed in association with the pistons 24 and 26 to bias them radially outwardly of shaft 12. As will become apparent however, hydraulic control is utilized to control the positions of the pistons.

By appropriate control of hydraulic fluid to the cylinder bores containing pistons 24 and 26, it is possible to change the relative positions of the pistons within the cylinder bores and thereby similarly bodily displace eccentric 22 radially on shaft 12 to correspondingly change the degree of eccentricity of the eccentric with respect to the shaft. The degree of eccentricity determines the mechanical advantage of the motor with increasing eccentricity providing increasing mechanical advantage. Increasing mechanical advantage creates a greater displacement so that the amount of shaft rotation per unit volume of flow into the motor decreases. In other words, for a given flow rate and pressure of power fluid to the motor, the increasing mechanical advantage caused by increasing the eccentricity causes the motor to develop an increased torque but at a decreased shaft velocity. In like fashion decreasing mechanical advantage creates a lesser displacement resulting in decreased torque at increased shaft speed for a given flow rate and pressure.

Since further details of the motor may be obtained by reference to the aforementioned U.S. patent, the additional constructional features of the motor will be mentioned herein only to the extent of stating that the left hand end of the motor as viewed in FIG. 1 comprises a suitable distributor valve 30 which selectively connects the radial cylinders with the hydraulic ports of the motor which are identified by the reference numerals 32 and 34. It will also be mentioned that the motor contains hydraulic control ports 36 and 38 for control of the pistons 24 and 26, with fluid communication from the control ports to the cylinder bores containing the control pistons being provided by suitable rings and bores in the shaft. It should also be pointed out that the construction details of the control pistons in the preferred embodiment used not be exactly like those shown in U.S. Pat. No. 3,828,400 and that the pistons may have the same or different areas and/or spring. Preferably the spring bias is such that the eccentric is urged to full displacement.

Figure 4:
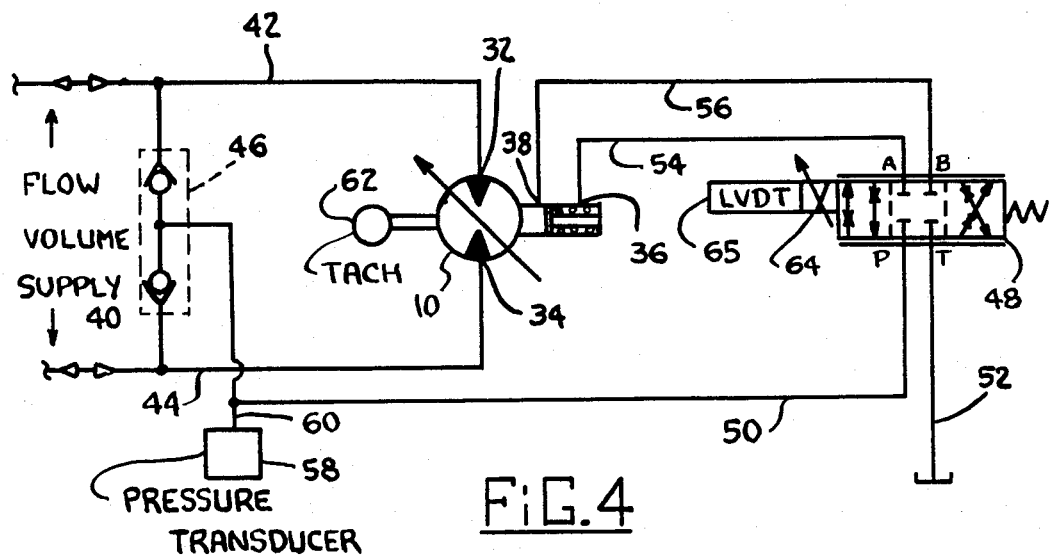
FIG. 4 is a general schematic diagram illustrating a preferred hydraulic circuit associated with the motor.

FIG. 4 illustrates schematically the preferred embodiment of hydraulic circuit which is used with motor 10 in the present invention. This circuit comprises a flow volume supply of hydraulic power fluid 40 which is connected to ports 32 and 34 of motor 10 by lines 42 and 44. The supply is bi-directional to provide bi-directional motor operation. The lines 42, 44 are shunted by a shuttle valve 46 whose inlets are teed into lines 42 and 44 respectively and whose outlet is connected to a variable control valve 48 by a line 50.

Valve 48 controls the pistons 24, 26 of the motor to vary the eccentric. The preferred control valve is illustrated as a four-way solenoid actuated, spring return, proportional control valve and the illustrated condition which is shown in the schematic shows the valve in the steady state control position.

The P, or pressure, port of the valve is connected to line 50. The T, or tank, port is connected to tank via a line 52. The A and B ports are connected via hydraulic lines 54 and 56 respectively with the control ports 36 and 38.

A pressure transducer 58 has a sensing port 60 teed into line 50. The pressure transducer provides an electrical output signal which is representative of the pressure existing in line 50. Since line 50 will be coupled to the higher pressure one of lines 42 and 44 by shuttle valve 46, the output signal of the pressure transducer will be representative of the fluid power pressure which is acting on pistons 16 of the motor for powering the motor output shaft and hence representative of motor load regardless of which direction the motor is being driven. A suitable correlation of the pressure signal output will be made to the actual pressure across the motor ports 32 and 34.

A signal representative of shaft speed is also developed. A convenient means for doing this comprises a tachometer 62 operatively coupled with the motor output shaft to provide such a signal. The electrical signals provided by the pressure transducer and the tachometer are utilized in the electrical control circuit of FIGS. 5 and 6, to be hereinafter described, to control the operation of the valve 48 and hence of the motor eccentric. For this purpose the electrical control provides a control signal to the solenoid 64 of valve 48 so that the commanded position of the spool of valve 48 is controlled to produce commanded motor action with predetermined limits. More specifically, the valve spool is displaced in one sense to increase the mechanical advantage of the motor, and it is displaced in the opposite sense to decrease the mechanical advantage. In the illustrated schematic the shifting of the valve spool to the right from any position decreases the mechanical advantage while shifting the spool to the left from any position increases the mechanical advantage.

In the preferred embodiment, an additional minor feedback loop is provided around valve 48 itself. The feedback sensor for this closed control loop is provided by a linear variable differential transformer 65 (LVDT) which senses the actual position of the spool and provides a feedback signal utilized in the closed loop control to secure correspondence of the actual spool position with the commanded position.

The preferred control valve for valve 48 is a proportional directional control valve manufactured by the assignee of this invention, Double A Products Company, as its "Series 3 Proportional Control Valve".

Figure 5:
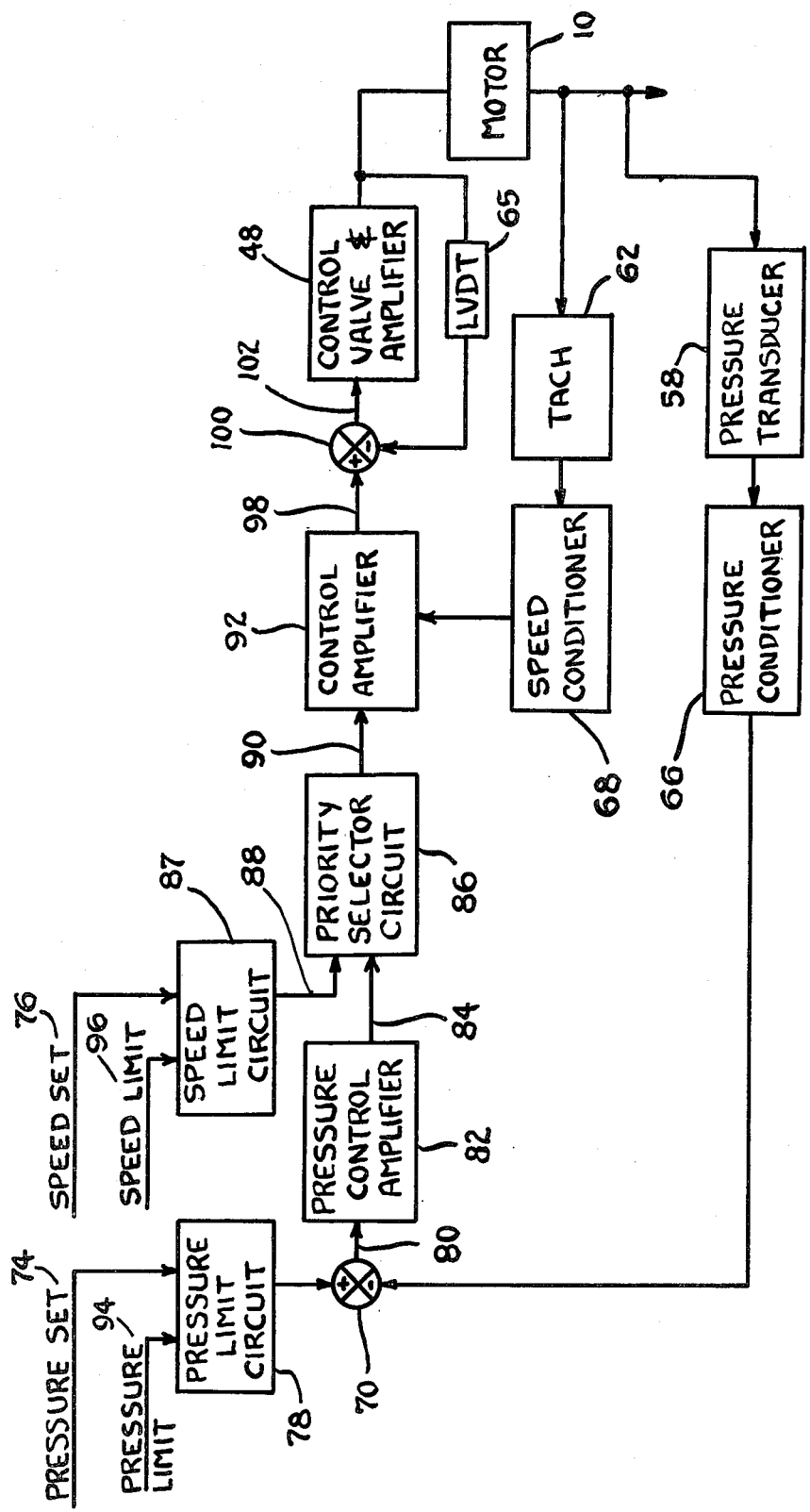
FIG. 5 is a general block diagram of the control system for the motor.

FIG. 5 illustrates a general block diagram of the control. It will be appreciated that the block diagram is intended to portray general principles of the invention and the fact that the control has been drawn in a particular fashion should not be construed to impute a limitation to the scope of the invention since the scope of the invention is defined by the claims at the end of this specification.

The components appearing in FIG. 5 which have already been described are identified by like numerals. These include motor 10, control valve 48, pressure transducer 58 and tachometer 62. As will be apparent from the general appearance of FIG. 5 the control is of a closed loop nature in which both motor speed and hydraulic fluid pressure are sensed and used in the control.

Associated with pressure transducer 58 is a pressure signal conditioner circuit 66, and a speed signal conditioner circuit 68 is associated with tachometer 62. The respective conditioner circuits function to condition the respective signals for use by the control electronics. The conditioned pressure signal is supplied to the subtracting input of a summing junction 70 while the conditioned tachometer signal is supplied to one of the blocks (to be described later).

It was previously mentioned that the control comprises inputs for setting pressure and speed. These inputs are identified in FIG. 5 by the respective reference numerals 74 and 76. The pressure setting signal is supplied as an input to a pressure limit circuit 78 and the output of the presure limit circuit is supplied to the adding input of summing junction 70. Summing junction 70 is effective to develop an output signal at 80 which is supplied as an input to a pressure control amplifier 82. The pressure control amplifier in turn develops an output signal at 84 which is supplied to a priority selector circuit 86. The speed setting signal 76 is supplied to a speed limit circuit 87. The output of the speed limit circuit is supplied at 88 to priority selector circuit 86.

It will have been observed that an additional signal input is associated with each of the pressure and speed limit circuits 78 and 87 respectively. For the former, it is a pressure limit signal 94, for the latter it is a speed limit signal 96. These two signals 94, 96 are pre-set within the control so as to be inaccessible by an operator of the control. In other words the adjustably settable signals 94 and 96 establish limits which cannot be exceeded even though the operator or control may attempt to command otherwise. Details of these limits and their significance in reflection to the motor will be seen in the detailed description later on.

The output signal from circuit 86 is supplied to control amplifier 92 which supplies at 98 an output to the adding input of a further summing junction 100. It is circuit 92 to which the conditioned tachometer signal is fed back. This further summing junction 100 is associated with the closed loop control of valve 48 which was mentioned above. The output signal from summing junction 100 is supplied at 102 as a command to precisely control the valve 48.

At this point it is appropriate to relate the operation of the control diagram depicted in FIG. 5 to adjustment of the mechanical advantage of the motor.

The block diagram depicts two feedback loops which are in addition to the feedback loop around control valve 48. These two loops are a speed control loop and a pressure control loop.

The speed control loop comprises the feedback from tachometer 62 as conditioned by conditioner circuit 68 and supplied to circuit 92. The command input signal to circuit 92 against which the conditioned speed feedback signal is compared in the speed control mode of operation is from speed limit circuit 87. Unless limited by the speed limit signal 96, that command signal is the speed set signal 76. Hence, in the speed control mode, the speed set signal 76 establishes a desired command speed for the motor and the closed speed control loop is effective to regulate the shaft speed to the commanded speed unless the speed limit signal 96 comes into play to limit the motor speed. The speed limit signal will come into play to limit the motor speed to a preset maximum if the control otherwise would command a higher speed.

When the control is operating in the speed control mode, change in certain conditions may cause the control to transfer to the constant horsepower control mode of operation. In the constant horsepower mode, the pressure control loop acquires priority from the speed control loop to effect a constant horsepower operation, yet in the disclosed embodiment of control to be described in detail hereinafter there is a certain interaction between the two control loops in certain aspects of the operation of the constant horsepower mode.

The pressure control loop comprises pressure transducer 58 and the conditioned pressure signal from conditioner circuit 66 to summing junction 70. The command input signal at line 80 to pressure control amplifier 82 is developed by comparing the conditioned pressure signal against the output signal from pressure limit circuit 78. Unless limited by the pressure limit signal 94, the command input signal from circuit 78 to summing junction 70 is the pressure set signal 74. The pressure control amplifier 82 acts upon the input signal at 80 to in turn develop a corresponding output signal at line 84 which is supplied to one of the inputs of the priority selector circuit 86.

When the pressure loop has priority, the priority selector circuit is effective to ignore the signal from speed limit circuit 87 and instead use the signal from pressure control amplifier 82 as the input to circuit 92. Although the pressure loop and speed loop are for operative purposes at any given instant of time mutually exclusive as to which one has priority, certain portions of the control hardware are commonly actively used in both modes of operation.

Indeed, the difference between the two loops may be viewed as follows. When the speed loop has priority, the signal at line 84 is ignored for control purposes in controlling the motor, and when the pressure loop has priority, the speed set signal is ignored for control purposes, it being recognized that in any event the pressure limit signal 94 and the speed limit signal 96 will always be effected to limit the pressure and speed respectively if the control attempts to exceed these limits regardless of which particular loop might have priority at any given instant of time. In other words at all times during operation of the control, a signal may be considered as being present at line 84 and a signal present at line 88. Priority selector circuit serves to determine which one of these will be ignored and which one will not be ignored for the immediate control purpose.

For the purpose of explanation of the system operation, let it be assumed that motor 10 is running at the set speed established by speed set signal 76 and the control is operating in the speed control mode. For load variations within a certain range at the set speed, the control causes no adjustment of the motor displacement, and such load changes are met merely by corresponding pressure changes. If the change is such that there is an incipient motor shaft speed increase, the tachometer signal feedback through the speed control loop indicates the incipient speed increase. This changes the command signal at 90 with the result that control amplifier 92 adjusts valve 48 such that the displacement of the motor is caused to increase. This will regulate the shaft speed back to the desired set speed. The increase in mechanical advantage of the motor in response to the need for speed correction is not incompatible with the load on the motor because the pressure will finalize at an appropriate level to match the load at the increased displacement while the set speed is maintained. In other words, even though the increase in the mechanical advantage will by itself inherently tend to increase the torque output of the motor, the final pressure will be appropriate, at the increased displacement, for the motor load, while the shaft speed is regulated to the set speed. Thus, under this type of change, the pressure control loop has no effect and the control remains in the speed control mode without the constant horsepower mode coming into play.

On the other hand, should the motor be operating at the set speed in the speed control mode when a motor load increase occurs beyond what the motor can deliver at the speed for a given horsepower output, the control will seek the constant horsepower mode. Typically, such load increase will be sensed as incipient speed decrease and/or pressure increase. A typical sequence of transfer from the speed control mode to the constant horsepower mode may be such that a decrease in shaft speed will begin to adjust the mechanical advantage of the motor before increased pressure has an effect. In such circumstance, the speed control loop retains priority, at least initially, so that in response to incipient reduction in shaft speed, sensed by the tachometer, a signal is provided to control amplifier 92 which is in turn effective on control valve 48 to begin decreasing the mechanical advantage of the motor so as to reduce the displacement and thereby attempt to counteract the speed reduction. The initial reduction in the mechanical advantage for speed regulation purposes augments the pressure increase caused by the increase load so that the pressure increases even more rapidly than it would if no reduction in mechanical advantage in fact took place. In a more extreme case, transfer from the speed control mode to the constant horsepower mode may occur without any actual correction of displacement for speed correction.

When the level of pressure sensed by transducer 58 reaches or exceeds the pressure level set by the lower of the pressure set signal 74 and the pressure limit signal 94, control transfers from the speed control loop to the pressure control loop. In other words, the signal at line 88 is ignored for the immediate control purpose in favor of the signal at line 84. The consequence of this is that a command signal is propagated on through control amplifier 92 to cause valve 48 now to increase the mechanical advantage of the motor. Although the mechanical advantage increase is seemingly in the wrong direction for correction of the speed decrease, this is indeed a most appropriate corrective action. The reason for this ostensibly counterproductive action is to allow the motor to develop torque sufficient to meet the increased torque load which has been imposed in the motor by operating along a constant horsepower curve corresponding to the set pressure. (This will be explained more fully later on with reference to FIG. 7.) Hopefully, the increased load will not have exceeded either the maximum torque which can be developed by the motor at the set pressure or the delivery capability of the associated hydraulic supply so that a point in the adjustment of the motor's mechanical advantange will be reached where in fact the motor develops enough torque to power the increased load.

Once this point has been reached, the control stabilizes and there is no further increase in motor displacement. If the load now begins to decrease, the control now is effective to correspondingly decrease the displacement allowing the speed to correspondingly increase such that constant horsepower is delivered by the output shaft. If the load decreases to a level where the set speed is reattained, control reverts to the speed control mode. In the operation of the electronic circuitry of the disclosed specific embodiment to be described in connection with FIG. 6, the pressure control loop has priority during constant horsepower operation in response to increasing load while the pressure control and speed control loop priorities interact during constant horsepower operation in response to decreasing load. Thus, it can be appreciated that the control provides an important capability in its ability to adapt to changing load conditions over a wide range so as to always optimize motor operation relative to such load changes within preset limits established by the control settings.

Thus the present invention also does not depend upon human operator reaction to load changes, and it will endeavor to: (1) to maintain constant horsepower at the set pressure regardless of speed, (2) override the constant horsepower operation at the set speed, (3) maintain an infinitely variable speed capability within the constant horsepower limit established by the pressure setting, or (4) come to a stall at maximum torque and displacement for the set pressure if the load is too great.

The foregoing description has described the operation of the control when transferring from the speed control mode. It is also appropriate to describe how the control responds when operating in the constant horsepower mode, although the above description contains some explanation of that mode.

In the constant horsepower mode of operation the motor operates along a particular constant horsepower curve which is a function of the set pressure. Assuming that sufficient power can be in fact delivered, changes in the load will be reflected merely as changes in the operating point along the established constant horsepower curve corresponding to the set pressure. In other words, if the load torque decreases, the motor speed increases and vice versa. Limits to any given pressure control constant horsepower curve are established on the one hand by the maximum displacement of the motor and on the other hand by the speed setting.

If the motor is operating on a constant horsepower curve and adjustment is made so as to increase the motor's displacement, thereby increasing the mechanical advantage, and if the mechanical advantage reaches its maximum and the load is still too great, then the motor stalls at the maximum torque which can be delivered at the set pressure.

In the other direction, if the load torque decreases and adjustment is made to decrease the motor's displacement, thereby decreasing the mechanical advantage, and if the motor speed would otherwise exceed the lower of the speed set signal 76 and the speed signal limit 96, then the motor will leave the pressure control mode of operation, and resume the speed control mode with the displacement being left at the appropriate setting for the control speed with the pressure assuming an appropriate level.

Figure 6B:
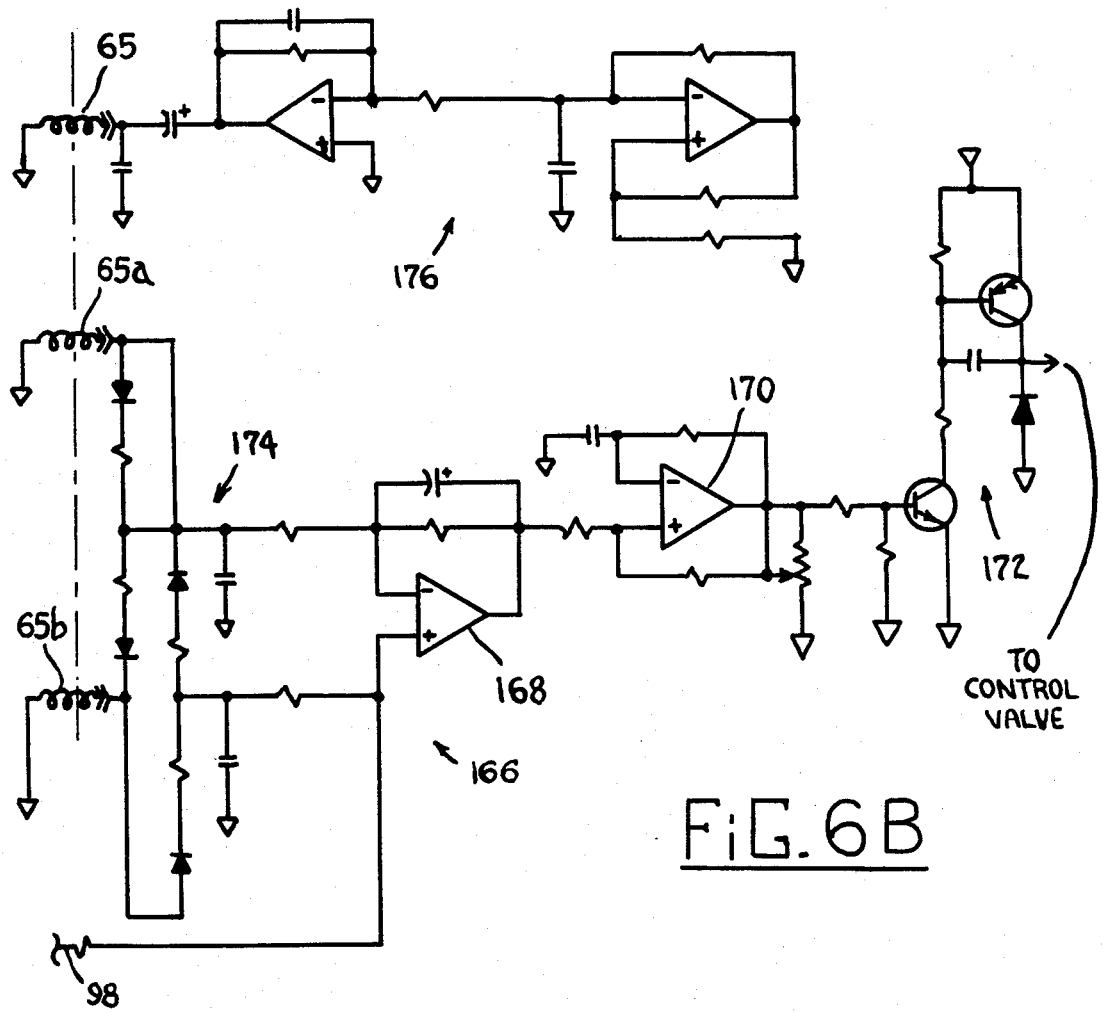
FIG. 6 is a more detailed electrical schematic diagram of the control electronics, comprising FIGS. 6A and 6B.
Figure 6A:
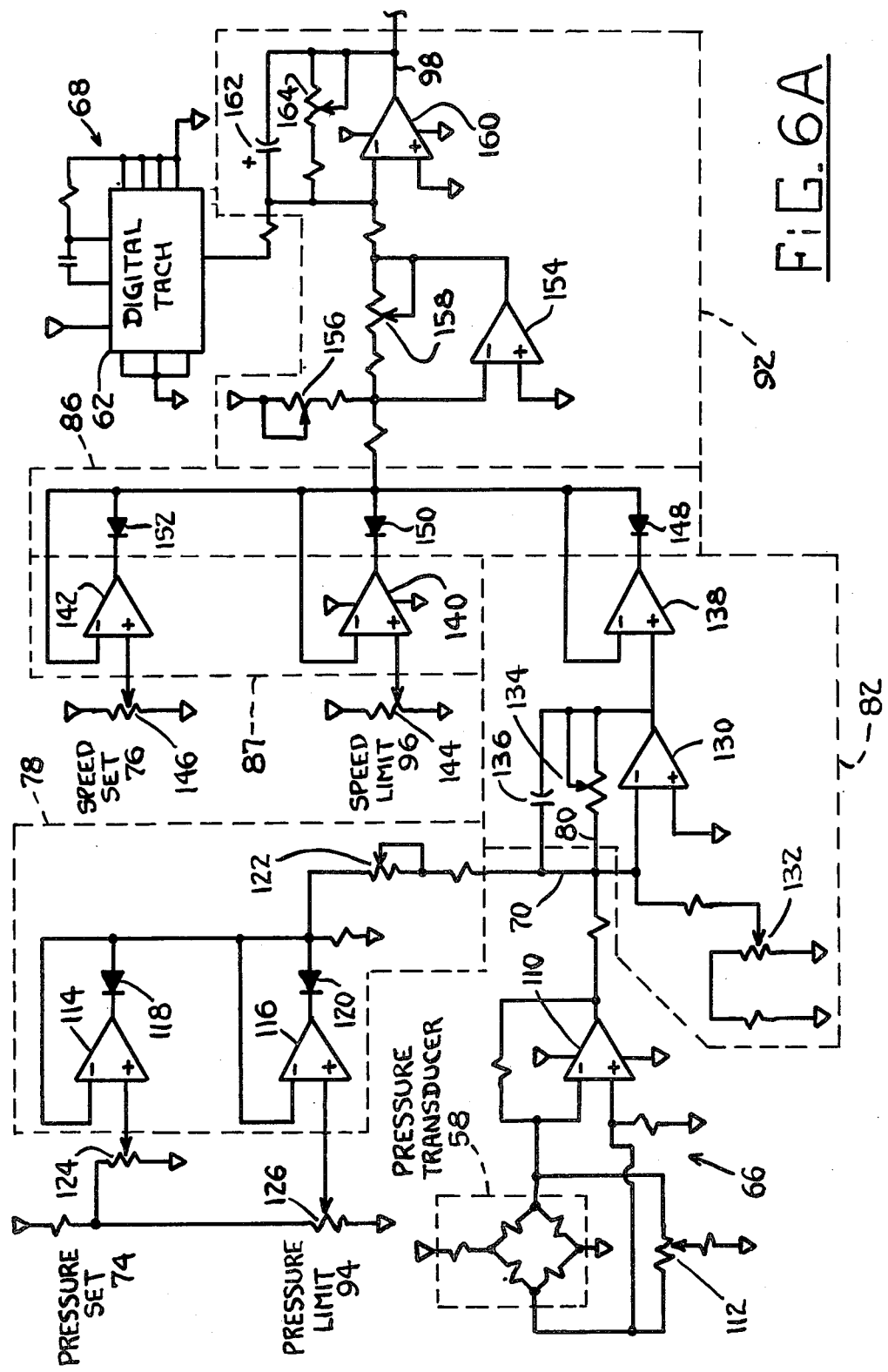

FIG. 6 illustrates a detailed electronic schematic diagram which reflects certain portions of the block diagram of FIG. 5. The circuits in FIG. 6 have been grouped within broken lines corresponding to the blocks of FIG. 5, but it is to be understood that this grouping is merely for explanatory purposes and substantial consistency with FIG. 5 and should not be construed as reflecting any particular limitation on the scope of the invention. The circuits are supplied from conventional power supplies which are not illustrated.

The disclosed embodiment of pressure transducer 58 is a bridge-type device which is connected in electrical circuit to provide an output signal across opposite points of the bridge which is representative of the sensed pressure. These opposite points of the bridge are operatively coupled as an input to an amplifier stage 110 forming the pressure signal conditioner circuit 66. This conditioning circuitry includes a zero adjustment comprising a potentiometer 112 to provide for proper zeroing of the pressure transducer in any given system installation.

Summing junction 70 is identified as a like numbered line in FIG. 6 and the output of amplifier stage 110 of conditioner circuit 66 is connected to this summing junction or sum line.

The pressure limit circuit 78 comprises a pair of amplifier stages 114 and 116 respectively whose outputs are coupled together through appropriately poled diodes 118 and 120 respectively having their cathodes commonly connected. A resistance network including a potentiometer 122 couples the outputs to sum junction 70.

The pressure set signal 74 is developed by stage 114 through the setting of a potentiometer 124 in an input circuit for this stage. The pressure limit signal 94 is developed by stage 116 through the setting of a potentiometer 126 in an input circuit for this stage.

The output signal of each of the two stages corresponds to a pressure established by the setting of the associated potentiometer in the input circuit. Hence, the signal output of stage 114 is representative of the pressure setting or pressure control signal provided by potentiometer 124, and the signal output of stage 116 is representative of the pressure limit signal provided by potentiometer 126. The illustrated circuit configuration coupling of the two stages 114, 116 is such that the actual command signal supplied to summing junction 70, for any given setting of the two potentiometers 124, 126, is in fact determined by only one of the stages in the exclusion of the other.

Specifically, the command signal which is supplied from pressure limit circuit 78 to summing junction 70 is the one of the two signals from stages 114, 116 which is representative of a lower magnitude of pressure. In the usual operation of the control system the pressure control setting (i.e. signal 74) will be lower than the pressure limit setting 94. As mentioned earlier, the pressure limit potentiometer is physically located in the control so as to be inaccessible by an operator. Hence, it acts as a limit in the event that the control would otherwise create a command signal which would represent a pressure exceeding the pressure limit setting.

Potentiometer 122 provides scaling of the command signal from pressure limit circuit 78 to set an appropriate span (i.e. range) for the pressures involved in any particular installation.

Pressure control amplifier 82 comprises an amplifier stage 130 having an input at which the summing action of summing junction 70 takes place. It will be understood that in the schematic of FIG. 6 the summing junction 70 may be considered as a single point even though it schematically appears as an element in FIG. 5. Hence, this explains why the reference numerals 70 and 80 in FIG. 6 refer to the same line of that detailed schematic.

The summing of the conditioned feedback pressure signal from circuit 66 with the pressure command signal from circuit 78 is an algebraic one with the conditioned pressure signal constituting negative feedback.

FIG. 6 is also shown to comprise a set point adjustment circuit including a potentiometer 132 which contributes a signal to summing junction 70. Also associated with stage 130 is a gain control for the stage in the form of a potentiometer 134, a loop compensation component in the form of a capacitor 136, and an output amplifier stage 138.

The speed limit circuit 87 comprises two amplifier stages 140 and 142. Stage 140 receives the speed limit signal 96. Stage 142 receives the speed set signal 76. The speed limit and speed set signals are provided by potentiometers 144 and 146 respectively which are connected as inputs to the amplifier stages 140 and 142 respectively. Thus, the output signal from stage 140 represents a maximum speed limit setting while the signal of stage 142 represents a desired speed setting. The setting of potentiometer 144 will correspond to the maximum motor speed rating (or any lesser speed limit required by a particular usage) and is adjustable in accordance with the particular size motor or usage involved in the same manner that the pressure limit setting 94 is made adjustable in view of the particular pressure ratings of the motor and associated hydraulic components (or any lesser pressure limit required by a particular usage).

The illustrated circuit configuration coupling of the two stages 140 and 142, in conjunction with the priority selector circuit 86 is such that for any given setting of the two potentiometers 144, 146 only one of the amplifier signals has priority. Exactly how this takes place can be best seen from consideration of the construction of the priority selector circuit 86 and its cooperative association not only with speed limit circuit 87 but also with the pressure control amplifier 82.

For purposes of explanation the priority selector circuit may be considered as comprising three diodes, 148, 150, 152 operatively connected wherein the anodes are in common and the cathode of each connects to the corresponding amplifier stage output 138, 140, 142 respectively. There is feedback from the common anodes to each amplifier's inverting input so that whatever signal is present at the common anodes becomes a reference input to all three stages 138, 140, 142. The signals developed by the three amplifier stages 138, 140 and 142 respectively are acted upon by the priority circuit such that at any given time one of the three signals has priority to the complete exclusion of the other two insofar as downstream control in providing the output signal from priority circuit 86 is concerned. In the speed control mode of operation the speed set signal will, via amplifier stage 142, have control. In the constant horsepower control mode of operation, the signal from the pressure control amplifier 82, provided via stage 138, will have control. If the signal from amplifier stage 142, or stage 138 for that matter, were to represent a speed greater than the speed limit set on potentiometer 144, then amplifier stage 140 has control. Of course, the particular times at which any given amplifier will have control are in accordance with the foregoing description of the respective constant horsepower and a speed control modes of operation which reflect constant horsepower and infinitely variable speed capabilities.

Control amplifier 92 comprises an amplifier stage 154 and the common anodes of diodes 148, 150, 152 are connected with the input of this amplifier stage. The amplifier stage 154 comprises a zero speed adjustment potentiometer 156 and a span adjustment potentiometer 158 which provide for calibration of the control to set zero speed and to establish the appropriate span (i.e. range) for any given installation. Thus stage 154 acts upon the signals from the preceding stages 138, 140, 142 in the same manner for whichever one of the three is in control.

Control amplifier circuit 92 further comprises an amplifier stage 160. A loop compensation capacitor 162 and a potentiometer 164 are operatively associated with amplifier stage 160. The input of stage 160 constitutes an internal summing junction at which the conditioned tachometer feedback signal is received and compared against the signal from stage 154 to closed loop control the motor's displacement. The output signal of stage 160 therefore represents the command signal (line 98) for control valve 48. It should be mentioned that tachometer 58 is capable of bi-directional operation to provide a suitable speed signal regardless of which direction motor 10 turns.

A control amplifier associated with valve 48 is designated by the general reference numeral 166. It comprises successive stages 168, 170 and a final two-transistor output stage 172 which energizes the solenoid 64 of valve 48. Circuit 166 is in general similar to that which is used in association with Double A Products Series 3 Valve referred to earlier.

The LVDT 65 comprises a pair of coils 65a, 65b which are operatively coupled via a demodulator circuit 174 which the input of stage 168 which is an amplifier stage. The output of stage 160 is coupled with the input of stage 168. The demodulated signal from the LVDT and the command signal from control amplifier 92 are algebraically summed at the input of stage 168 to provide a corresponding signal which is supplied to circuit 170. Circuit 170 is a pulse width modulator providing a pulse width modulated drive for solenoid 64. The LVDT senses the position of the valve spool whereby a feedback signal is induced in the coils 65a, 65b to provide the feedback signal for the closed loop around the control valve. This loop operates the valve into precise correspondence with the command signal from control amplifier 92.

The circuitry also includes an oscillator 176 which induces a 6000 Hertz signal in the coils 65a, 65b via inductive coupling. It is the induced signals in the two coils which are demodulated by the demodulator circuit 174 to provide a suitable feedback signal for processing at the input of amplifier stage 168 with the output signal from control amplifier 92. This then completes the description of the electrical schematic drawing of FIG. 6.

It is to be noted that the hydraulic circuit connection comprises the outlet of the shuttle valve being coupled to the P port of control valve 48. With this arrangement the fluid power supplied to valve 48 is reflective of the pressure applied to the motor regardless of which direction the motor is being run. The pressure transducer is connected in this line so that it too always senses the pressure applied to the motor regardless of which direction the motor is operating. This is an advantageous arrangement in that there is no need to change the control or any connections when the motor is reversed. All that need be done is to reverse the direction of flow to the motor and the control automatically will respond to provide the same type of control to either direction of motor rotation.

The operation of the electronic control circuit may be related to the previous motor control description in the following manner. The speed and pressure feedback signals will continuously be providing information to the control circuit. It is how the control acts upon that information which will be explained.

Pressure control amplifier 82 is operative to continuously compare the pressure feedback against the lower of the pressure set and pressure limit signals as determined by pressure limit circuit 78, and this is well shown in the schematic of FIG. 6 by the connection of the two circuits' outputs at sum line 70. Whether this comparison at any given instant of time will have priority insofar as creating the actual control signal to control amplifier 92 is concerned will depend upon several factors. These factors include the results of the comparison, the setting of set point potentiometer 132, and the signal from speed limit circuit 87. By the same token, whether the signal from speed limit circuit 87 will have priority at any given instant of time will depend upon its value relative to the output from pressure control amplifier 82. It should also be noted that because the speed feedback is introduced downstream of the priority select circuit 86 in the disclosed embodiment it will always have effect felt in the determination of the command signal to control valve 48.

With the motor operating at the set speed and delivering a torque within the motor's capability at the set speed, the control is in the speed control mode. The pressure will be below the set pressure limit, and the signal from speed limit circuit 87 will have the priority in providing the command signal to control amplifier 92. The speed feedback, when compared against the command signal from priority circuit 86, creates a suitable command signal to the control valve 48 to cause the displacement to be kept in its existing position.

For certain load changes within the delivery range of the motor at the set speed the pressure does no increase sufficiently to change the relationship between the feedback pressure and the pressure setting provided by circuit 78 to cause the pressure control amplifier to assume priority over the speed circuit 87. Since the speed does not change, there is no change in the motor's displacement.

Should a fluctuation occur such that there is an incipient speed increase, this is detected by the speed feedback with the result that control amplifier 92 sends a command signal to control valve 48 to command a change which will increase the motor's displacement. When the displacement has been appropriately adjusted, the speed feedback is correspondingly reduced so that a stability is achieved at the increased displacement. Of course during this transition the pressure will not seek to rise above the set pressure and will in fact always remain below the set pressure, so that the speed limit retains priority toward securing the necessary displacement to regulate the speed to the speed setting.

On the other hand should the motor load increase above that which it can deliver at the set speed, the control will seek the constant horsepower mode with the pressure control amplifier coming into active play in determining the command signal from amplifier 92 to the control valve. The operation of the electronic circuit of FIG. 6 will be described for the typical transfer sequence described above in connection with FIG. 5.

If the load change is such that an incipient speed reduction is detected by the speed feedback before the pressure exceeds the pressure setting, the decrease in speed feedback, when compared against the speed limit signal which is still prioritized (albeit temporarily until the pressure rises above the set pressure), will cause the control amplifier signal to the control valve to command a decrease in motor displacement in an attempt to correct for the sensed speed reduction. But this is the wrong direction to provide the torque increase which is in fact needed to power the increased load.

The decrease in motor displacement augments the pressure increase which is occurring anyway so that the pressure setting is reached even faster than it would if the motor displacement had not decreased. Thus, the pressure control amplifier now comes actively into play.

For purposes of explanation, the priority selector circuit in effect causes the lowest magnitude signal of the three amplifiers 138, 140, 142 to appear at the common anodes of diodes 148, 150, 152. Hence, when the speed limit circuit 87 has control, its signal is lower than the signal from the pressure control amplifier. Now when the pressure control amplifier takes priority, its signal from amplifier 138 is lower than that from circuit 87. It will also be recognized that the signal from amplifier 138 will be lower than that from the tachometer feedback so that the net effect of the pressure control circuit assuming priority is to create a command signal, via control amplifier 92, to cause the displacement to increase. This allows the motor to develop increased torque while the speed continues to drop providing constant horsepower.

Now if sufficient torque can be developed by the motor, the speed will stabilize and the speed feedback will drop no further. Hence further increase in the displacement will not occur, and the motor operation will stabilize. This action will have taken place along a constant horsepower curve for the particular pressure setting, and the pressure control will have had priority. Assuming that there are no further changes in the load, the control will operate at that point.

If the motor load had increased to a point where even at the maximum displacement sufficient torque could not have been delivered, the motor would have come to a stall.

If a stable operating point including stall along the constant horsepower curve had been attained and if the load now begins to decrease, an interaction occurs between the pressure control loop and the speed control loop which returns the motor along the constant horsepower curve and in the limit to the set speed. A decrease in load is reflected in an incipient pressure decrease and an incipient speed increase. But for constant flow the speed connot increase until the displacement decreases. Therefore, in order to actually cause a decrease in displacement, the pressure control circuit must temporarily relinquish priority to the speed circuit 87. The control now compares the feedback speed signal aganist the set speed signal and because the feedback speed is less than the set speed, the control amplifier commands the control valve to decrease the motor displacement. If the decrease in displacement occurs too fast in relation to the load decrease, control reverts to the pressure control amplifier because the increased pressure will have been effective to cause priority to return to the pressure control mode. Thus, depending upon the nature of the change in displacement to the change in load, the control may, for a continuously decreasing load along the constant horsepower curve, transfer back and forth between speed and pressure control loops. In the disclosed control, it is important that both pressure and speed signals always be present, and it will be particularly noted that the speed feedback is always having an influence in the determination of the command signal to the control valve in both constant horsepower and speed control modes.

While the foregoing description of the control electronics has set forth a particular example of operation, it will be appreciated that variations may be indulged in within the generic aspects of this invention, both as to specific operation as well as actual circuit construction. Of course, it will also be appreciated that general principles of feedback control wil be used in developing any given application so as to insure desired response and stability chracteristics, and therefore application of such principles to any given application of the invention may result in differences in details of operation within the generic control philosophy. Specific details of electronic and hydraulic circuits will be designed according to well known and conventional engineering design practices.

Figure 7:
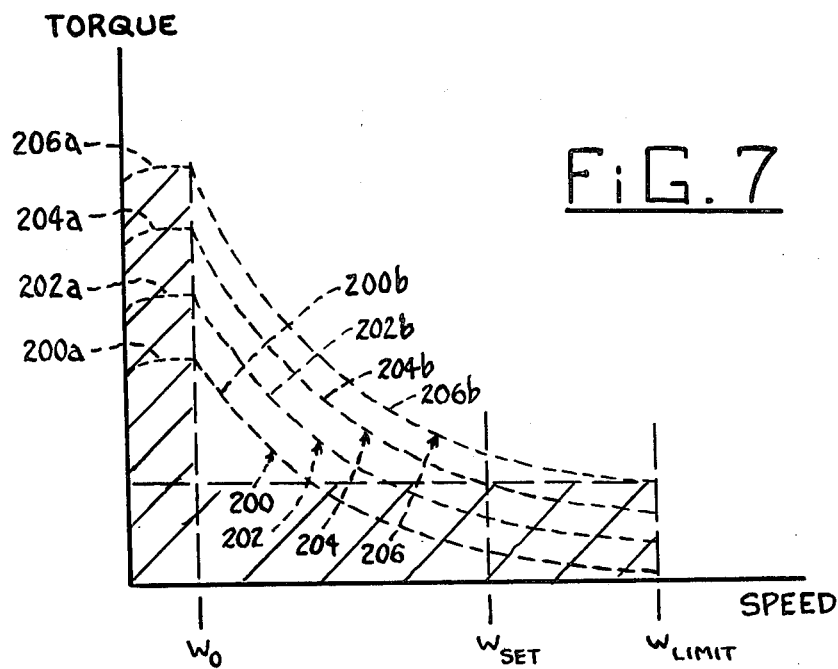
FIG. 7 is a series of graph plots useful in explaining principles of the invention.

FIG. 7 illustrates a series of graph plots which are useful in portraying the operation of the control. The horizontal axis represents speed and the vertical axis represents torque. Each graph plot 200, 202, 204, 206 corresponds to a particular pressure setting of the pressure setting control signal 74, and they are in the order of increasing pressure settings. The curves are of similar shape and each comprises a segment 200a, 202a, 204a, 206a which represents operation at maximum motor displacement. The torque which can be developed at maximum displacement is a function of the pressure setting, and hence as the pressure setting increases the torque which can be developed at maximum displacement also increases.

For a given flow at maximum displacement there is a maximum speed $W_O$ which can be developed and this constitutes a break point at the right hand end of each segment 200a, 202a, 204a, 206a. For each of the graph plots the corresponding break point constitutes the beginning of a constant horsepower curve segment 200b, 202b, 204b, 206b. The constant horsepower curve segments are characterized by a relationship wherein for each constant horsepower curve the displacement is adjusted so that for any speed above the speed $W_O$, the horsepower output, which is a product of torque and speed, remains constant. Hence, when the control is operating in the constant horsepower mode it is operating along one of the constant horsepower curves such as those depicted in the drawing with the particular curve depending upon the pressure setting. In other words, the pressure setting determines the particular characteristic curve.

The speed set signal determines a speed which interacts with the constant horsepower curve segments. If the control is operating along a constant horsepower segment of one of the curves and if the load decreases to a point where the shaft speed has been brought up to the set speed $W_{set}$, the control reverts to the speed control mode and the motor will inherently operate at the set speed to develop the proper torque. This is exemplified in the graph plot by operation along the vertical line passing through the set speed $W_{set}$. Thus, the setting of $W_{set}$ determines the right hand end point of each constant horsepower segment.

In the event that the set speed were adjusted to exceed the maximum speed limit $W_{limit}$ then the control would operate along the maximum speed limit vertical axis. It can therefore be seen that the maximum speed limit setting defines a limit in any event which limits the maximum speed of the output shaft.

Constant horsepower control may be summarized as follows for curve 206 by way of illustration. At the set pressure, the motor will start and develop the maximum torque to overcome the load. As the load drops, the speed will increase to the maximum possible speed for the given flow and maximum displacement (i.e. the breakpoint between 206a and 206b). As the torque demand decreases the displacement is reduced to keep the pressure at the set level. This in turn increases the speed for the given flow. Thus, the motor will operate along the particular constant horsepower curve segment 206b in both directions as described above. It remains in the speed control mode only if the load drops so that the speed would otherwise increase beyond the lower of the set speed or the speed limit. In the speed control mode, the pressure falls below the set pressure to deliver the required torque.

In an infinitely variable speed control it is practical to assume that for starting purposes, acceleration forces will cause the motor to operate as a constant horsepower control as described above. When the motor reaches the set speed the control will adjust the displacement to maintain that speed.

The advantages of the control capability of the present invention are graphically portrayed by comparing the curves 200, 202, 204, 206 with the two generally rectangular shaded areas extending along the vertical and horizontal axes. These shaded areas represent the capability of conventional two speed drives having a high speed range and a low speed range. Such two speed drives operate such that variable speed is attainable within the speed limit range but at relatively low torque level. For torque demands greater than this relatively low level, the speed range must be compromised in order to develop more torque even though the actual load torque may be much less than the ultimate torque capability of the motor. There is no in-between compromise. The invention provides a significant improvement in control capability over prior two and three speed systems.

Figure 8:
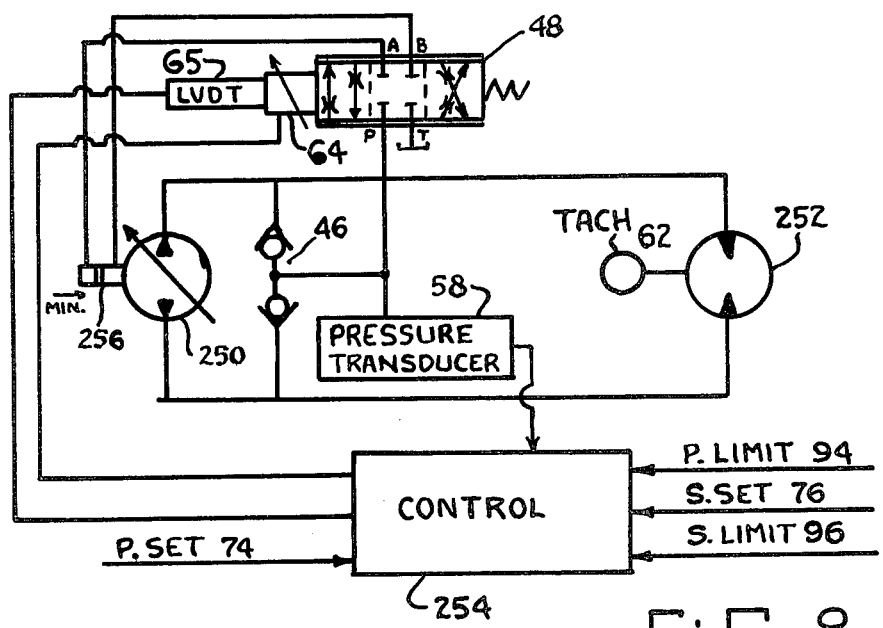
FIG. 8 is a block diagram illustrating application of the invention to a variable displacement pump.

Principles of the invention may also be applied to control of a variable displacement hydraulic pump for controlling a hydraulic motor. This is schematically illustrated in FIG. 8. FIG. 8 illustrates a variable displacement pump 250 supplying a fixed displacement motor 252. Tachometer 62 remais coupled to the motor output shaft providng measurement of the shaft speed of motor 252. The tachometer supplies a feedback signal to the control electronics which are designated by the general reference numeral 254.

Other inputs to the control circuitry 254 are the various signals previously described which are identified by the same reference numerals.

Control valve 48 and shuttle valve 46 are also used, with the shuttle valve inlets being connected to the lines to the motor and with the outlet of the shuttle valve being connected to the P-port of control valve 48. The A- and B-ports of the control valve are connected with a fluid actuated device 256 of the pump for adjusting the pump's displacement. Adjustment of the pump's displacement is effective in the same manner as was the adjustment of the motor's displacement in FIG. 4 to control the motor's speed.

In the FIG. 8 embodiment, speed is decreased by decreasing displacement and increased by increasing displacement. The speed control mode of operation for both the FIG. 4 and FIG. 8 embodiments comprises the same infinitely variable capability. However, if the pressure setting is exceeded, the FIG. 8 embodiment behaves differently. It does not operate along a constant horsepower curve, but rather, because the displacement is caused to decrease when the pressure setting is exceeded, the pump adjusts its output toward slowing down the motor. Thus, the FIG. 8 embodiment does not, in this case, operate along a constant horsepower curve since it lacks the relationship of a variable displacement motor wherein mechanical advantage is a function of the displacement.

The feedback from the LVDT 65 to the control is also the same and the control provides an output signal for controlling the solenoid energization of the solenoid of the control valve.

Pressure is sensed by the control in the same manner. The system of FIG. 8 may also have bi-directional capability.

For the FIG. 4 embodiment an inherent consequence of the illustrated control arrangement where the motor attempts to overrun is that the displacement is adjusted to maximum so as to create maximum resistance to external rotational forces on the output shaft. This will be true in both control modes. In a closed hydraulic loop sufficient fluid will continue to be supplied. In an open loop additional means may be needed to keep the motor filled with fluid. A bi-directional capability of the tachometer which senses direction of rotation is useful in determining the correct porting of make-up fluid to prevent cavitation.

The control of the present invention affords a range of possible applications. One new and unique application comprises a single pump powering multiple hydrostatic motor-drives with a control for each motor being effective to maintain desired set speed for that motor even as other motors impose changing flow demands on the pump. This correction of displacement to maintain set speed for any particular motor will always take place within the framework described with reference to FIG. 4. This points up that the control will respond to changes in flow (independent of load changes) always seeking operation with this framework of the control.

The foregoing has described a preferred embodiment of the invention. As noted above, variations on the disclosed embodiment may be indulged in within the generic aspects of the invention.

What is claimed is:

1. A system for controlling a hydraulic fluid powered rotary output shaft comprising a chamber space for hydraulic power fluid having variable displacement, an operative coupling from said chamber space effective to rotate said output shaft by the hydraulic power fluid in said chamber space, means to adjust the displacement of said variable displacement chamber space, means providing a speed representative signal representative of the rotational speed of said output shaft, means providing another signal representing another parameter indicative of load on said output shaft, means providing a speed control signal representative of a predetermined rotational speed for said output shaft, means providing a further control signal representing a predetermined value for said another parameter, means comparing said speed representative signal against said speed control signal, means comparing said another signal against said further control signal, and priority according means comprising means according priority to the comparison of said speed representative signal and speed control signal in closed loop control of the adjustment of the displacement of said chamber space when said further control signal and said another control signal bear one predetermined relationship with each other and means according priority to the comparison of said another control signal and said further control signal in closed loop control of the adjustment of the displacement of said chamber space when said another signal and said further control signal bear another predetermined relationship with each other.

2. A system as set forth in claim 1 in which said means comparing said another signal against said further control signal, when accorded priority in closed loop control of the adjustment of the displacement of said chamber space, is effective to increase the displacement.

3. A system as set forth in claim 1 in which said means comparing said speed representative signal against said speed control signal, when accorded priority in closed loop control of the adjustment of the displacement of said chamber space, comprises means for causing the displacement to increase in response to a sensed increase in speed and to decrease in response to a sensed decrease in speed.

4. A system as set forth in claim 1 in which said means providing a speed representative signal is operatively associated with said priority according means in closed loop control of the adjustment of the displacement of said chamber space to provide said speed representative signal as a feedback signal which is active at all times in the closed loop control regardless of the accorded priority.

5. A system as set forth in claim 1 wherein in said means providing another signal representing another parameter indicative of load on said output shaft comprises means sensing pressure of hydraulic fluid powering said output shaft, said means providing a further control signal representing a predetermined value for said another parameter comprises means providing a pressure level signal representing a selected level of pressure of the hydraulic fluid powering said output shaft, said means comparing said another signal with said further control signal comprises means comparing said sensed pressure with said pressure level signal, and said means according priority to the comparison of said another control signal and said further control signal in closed loop control of the adjustment of the displacement of said chamber space comprises means according priority to the comparison of said sensed pressure and said pressure level signal when said sensed pressure equals or exceeds pressure corresponding to that established by said pressure level signal.

6. A system as set forth in claim 5 in which said means comparing said speed representative signal against said speed control signal, when accorded priority in closed loop control of the adjustment of the displacement of said chamber space, comprises means for causing the displacement to increase in response to a sensed increase in speed and to decrease in response to a sensed decrease in speed.

7. A system as set forth in claim 6 in which said means comparing said another signal and said further control signal in closed loop control of the adjustment of the displacement of said chamber space, when accorded priority in closed loop control of the adjustment of the displacement of said chamber space, comprises means to cause the displacement to increase.

8. A system as set forth in claim 1 in which said rotary output shaft is the output shaft of a hydraulic motor, said variable displacement chamber space and said operative coupling are contained within said motor, said means to adjust the displacement of said variable displacement chamber space includes an adjustment mechanism within said motor, and said motor comprises an arrangement and construction in which said adjustment mechanism inherently adjusts the mechanical advantage of said operative coupling when adjusting the displacement of said variable displacement chamber space.

9. A system as set forth in claim 8 in which said adjustment mechanism and said operative coupling comprise an arrangement and construction which is effective to cause the mechanical advantage of said operative coupling to increase as the displacement is being adjusted to increase and to decrease as the displacement is being adjusted to decrease.

10. A system as set forth in claim 8 in which said means providing a speed representative signal is operatively associated with said priority according means in closed loop control of the adjustment of the displacement of said chamber space to provide said speed representative signal as a feedback signal which is active at all times in the closed loop control regardless of the accorded priority.

11. In combination with a hydraulic motor of the type comprising expansion chambers defining the motor's displacement and receiving hydraulic fluid power, an output shaft, means operatively coupling said expansion chambers with said output shaft to cause said output shaft to rotate at a speed essentially directly proportional to the volumetric flow rate of hydraulic fluid power to said expansion chambers, and mechanical adjustment means for adjusting the motor's displacement and the mechanical advantage of the operative coupling of said expansion chambers with said output shaft such that said mechanical advantage and the motor's displacement increase together and decrease together, an improved control for said motor comprising means providing a speed representative signal representative of the speed of said output shaft, means providing another signal representing another parameter of the motor's operation indicative of load, means providing a speed control signal representative of a desired speed for said output shaft, means providing a further control signal representing a selected value for said another parameter, a first control loop comprising means comparing said speed representative signal with said speed control signal in closed loop control of said mechanical adjustment means to cause said output shaft to operate at said desired speed when said another signal and said further control signal bear one predetermined relationship with each other and a second control loop comprising means comparing said speed representative signal against the comparison of said another signal with said further control signal in closed loop control of said mechanical adjustment means when another signal and said further control signal bear another predetermined relationship with each other.

12. The combination set forth in claim 11 in which said means providing another parameter of the motor's operation comprises means providing a pressure measurement signal representing pressure of hydraulic fluid power to said expansion chambers, said means providing a further control signal representing a selected value for said another parameter comprises means providing a pressure level signal representing a selected level of the pressure of hydraulic fluid power on said expansion chambers, the comparison of said another signal with said further control signal comprises means comparing said pressure measurement signal with said pressure level signal, and said second control loop provides the closed loop control of said mechanical adjustment means when the measured pressure exceeds the selected pressure level.

13. The combination set forth in claim 11 wherein said first control loop further includes means for setting a maximum speed limit representative of a maximum speed for said output shaft and said control comprises means to limit said mechanical advantage to a setting which prevents said maximum speed limit from being exceeded if the control otherwise attempts to command a greater speed.

14. The combination set forth in claim 11 in which said second control loop includes means for setting a predetermined maximum limit for said another parameter and said control comprises means responsive to said predetermined maximum limit for said another parameter to prevent said predetermined maximum limit from being exceeded even if the control otherwise attempts to command so.

15. The combination set forth in claim 11 in which said second control loop comprises means to cause said mechanical advantage and displacement to be adjusted so as to increase the motor torque along a constant horsepower curve.

16. The combination set forth in claim 15 in which said second control loop coacts with said first control loop to return the motor speed toward the predetermined speed setting once the torque demand has been met.

17. The combination set forth in claim 11 in which said motor is bi-directional and further including a shuttle valve having its inlets connected across hydraulic fluid power lines to said motor and having its outlet connected to the P-port of a directional control valve which controls the application of hydraulic fluid power to control said mechanical adjustment mechanism.

18. The combination set forth in claim 17 wherein said means providing a further control signal representing a selected value for said another parameter indicative of load comprises a pressure transducer connected to sense the pressure at the outlet of said shuttle valve.

19. For use with a hydraulic power system having a rotary output shaft, a chamber space for hydraulic power fluid having variable displacement, an operative coupling from the chamber space effective to rotate the output shaft by the hydraulic power fluid in the chamber space, an improved control for the system comprising means for receiving a speed indicative signal indicative of the rotational speed of the output shaft, means for receiving another signal indicative of the load on the output shaft, means for setting a speed control signal representing a desired rotational speed for the output shaft, means for setting a further control signal representing a predetermined load for the output shaft, means for comparing said speed indicative signal against said speed control signal, means for comparing said load indicative signal against said further control signal, priority according means comprising means for according priority to the comparison of said speed indicative signal and said speed control signal when said load indicative signal and said further control signal bear one predetermined relationship with each other and means for according priority to the comparison of said load indicative signal and said further control signal when said load indicative signal and said further control signal bear another predetermined relationship with each other, and means for providing an output command signal for use in the closed loop control of the adjustment of the displacement of the chamber space based upon the priority accorded by said priority according means.

20. An improved control as set forth in claim 19 in which said priority according means comprises first means for receiving the comparison of said load indicative signal and said further control signal, second means for receiving said speed indicative signal, and means for passing one to the exclusion of the other, and output means for receiving the signal passed by said priority according means and comparing it against said speed indicative signal to develop said output command signal.

* * * * *

UNITED STATES PATENT AND TRADEMARK OFFICE
CERTIFICATE OF CORRECTION

PATENT NO. : 4,474,104

DATED : October 2, 1984

INVENTOR(S) : David F. Creffield

It is certified that error appears in the above-identified patent and that said Letters Patent is hereby corrected as shown below:

In claim 20, line 5 thereof, (column 24, line 25) "indicative" should read --control--.

Signed and Sealed this

Fourteenth Day of May 1985

[SEAL]

Attest:

DONALD J. QUIGG

Attesting Officer     Acting Commissioner of Patents and Trademarks